UNITED STATES PATENT OFFICE.

HANS KUŽEL, OF HÖCHST-ON-THE-MAIN, GERMANY, ASSIGNOR TO THE FARB-WERKE, VORMALS MEISTER, LUCIUS & BRÜNING, OF SAME PLACE.

AZO DYE.

SPECIFICATION forming part of Letters Patent No. 458,284, dated August 25, 1891.

Application filed August 11, 1890. Serial No. 361,723. (Specimens.)

*To all whom it may concern:*

Be it known that I, HANS KUŽEL, doctor of philosophy, a citizen of the Empire of Germany, residing at Höchst-on-the-Main, in the Empire of Germany, have invented certain new and useful Improvements in Coloring-Matter; and I do hereby declare the following to be a full, clear, and exact description of the invention, such as will enable others skilled in the art to which it appertains to make and use the same.

My invention relates to the production of novel coloring-matter by the action of diazo bodies upon the naphthol trisulphonic acid-monamide described in the application for Letters Patent, Serial No. 361,722, and which is formed by adding a solution of caustic ammonia to the naphtosulton disulphonic acid obtained from the naphthaline trisulphonic acid, prepared by sulphonation of naphthaline, by nitration and reduction, by treatment of the novel naphthylamine trisulphonic acid with nitrous acid and subsequent boiling with acidulated water.

The diazo bodies to be employed are prepared from the following bases and sulphonic acids: aniline, para-nitraniline, toluidine, xylidine, cumidine, anisidine, phenetidine, amidoparacresolmethylether, alpha-naphthylamine, beta-naphthylamine, amidoazobenzole, amidoazotoluol, amidophenole, acetylphenylendiamine, aniline sulphonic acid, toluidine sulphonic acid, xylidine sulphonic acid, amidophenol sulphonic acid, amidonaphthol sulphonic acid, naphthionic acid, naphthalidinic acid, beta-naphthylamine sulphonic acid, beta-naphthylamine disulphonic acid, alpha-naphthylamine disulphonic acid, amidoazo-benzole sulphonic acid, amidobenzoic acid, amidosalicylic acid.

Example: Ninety-three parts, by weight, of aniline or the equivalent quantity of one or the other of the bodies enumerated hereinbefore are diazotized in the usual manner, and the product added to a solution of four hundred and eighty parts, by weight, of the naphthol trisulphonic acid monamide, hereinbefore designated, in four thousand five hundred parts, by weight, of water, to which are admixed one hundred and twenty parts, by weight, of caustic soda, or two hundred parts, by weight, of common soda, or three hundred parts, by weight, of acetate of sodium, while stirring well all the time. There will form a red solution of the coloring-matter, from which the latter is precipitated by means of a large quantity of common salt. After being dried the coloring-matter will present itself in the form of a brown powder of very easy solubility in water. It is insoluble in absolute alcohol. With concentrated sulphuric acid a yellowish scarlet-red solution is obtained.

When goods are treated with this dye and sulphuric acid in the same process as is usually applied with the azo colors, a pronounced bluish-red shade is obtained, which resists the influence of light very well.

What I claim as my invention is—

As a new coloring-matter, a dark reddish-brown powder derived from the herein-described naphthol trisulphonic acid-monamide and diazo bodies, easily soluble in water, insoluble in absolute alcohol, dyeing wool a pronounced bluish-red shade, substantially as herein specified.

In testimony whereof I affix my signature in presence of two witnesses.

HANS KUŽEL.

Witnesses:
RUDOLPH MAUES,
HEINRICH HAHN.